(12) United States Patent
Shinada

(10) Patent No.: US 7,019,813 B2
(45) Date of Patent: Mar. 28, 2006

(54) INTERNAL-SURFACE-SCANNING IMAGE RECORDING APPARATUS

(75) Inventor: Hidetoshi Shinada, Hertfordshire (GB)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 887 days.

(21) Appl. No.: 09/973,812

(22) Filed: Oct. 11, 2001

(65) Prior Publication Data

US 2002/0044310 A1    Apr. 18, 2002

(30) Foreign Application Priority Data

Oct. 13, 2000  (JP)  ............... 2000-313598

(51) Int. Cl.
*G03B 27/58* (2006.01)
*H04N 1/04* (2006.01)

(52) U.S. Cl. ...................... 355/47; 358/493
(58) Field of Classification Search .......... 355/47; 358/493
See application file for complete search history.

(56) References Cited

U.S. PATENT DOCUMENTS

| | | | |
|---|---|---|---|
| 1,533,422 A | 4/1925 | Jenkins | |
| 4,193,662 A | 3/1980 | Hara | |
| 4,479,133 A | 10/1984 | Shiozawa et al. | |
| 4,674,827 A | 6/1987 | Izutsu et al. | |
| 5,627,929 A | 5/1997 | Vawter et al. | |
| 6,108,466 A | 8/2000 | Aksyuk et al. | |
| 6,252,694 B1 * | 6/2001 | Shinada | 359/201 |

FOREIGN PATENT DOCUMENTS

EP    0 915 613 A1    5/1999

OTHER PUBLICATIONS

Modulators and switches are key to all-optical networks', Jeff Hecht, Understanding Fiber Optics, 3rd, Ed., Jun. 1999, pp. 85, 96, 99, 90 and 91.
"Xpose!", Lüscher AG Maschinenbau, Oct. 13, 2000.

\* cited by examiner

*Primary Examiner*—Rodney Fuller

(57) ABSTRACT

A light beam modulated with image information is outputted from a light source and supplied to a switcher, which guides the light beam to one of exposure heads that is selected by the switcher. The light beam is applied from the selected exposure head to a photosensitive medium that is mounted on a partly cylindrical inner circumferential surface of a support to record an image thereon. The light beam can continuously be applied to the photosensitive medium from the exposure heads that are alternatively selected as facing the photosensitive medium, so that the image can efficiently be recorded on the photosensitive medium.

15 Claims, 7 Drawing Sheets

INTERNAL-SURFACE-SCANNING IMAGE RECORDING APPARATUS

BACKGROUND OF THE INVENTION

1. Field of the Invention

The present invention relates to an internal-surface-scanning image recording apparatus for recording an image on a photosensitive medium held against the cylindrical inner circumferential surface of a support, by scanning the photosensitive medium with a light beam that has been modulated with image information.

2. Description of the Related Art

Apparatus for recording an image on a photosensitive medium with a laser beam include a planar-surface-scanning image recording apparatus for applying a laser beam in a main scanning direction to a planar photosensitive medium which is being fed in an auxiliary scanning direction to record an image on the planar photosensitive medium, an external-surface-scanning image recording apparatus for applying a laser beam to a photosensitive medium mounted on the outer circumferential surface of a drum which is being rotated to record an image on the photosensitive medium, and an internal-surface-scanning image recording apparatus for applying a laser beam to a photosensitive medium mounted on the cylindrical inner circumferential surface of a support drum to record an image on the photosensitive medium.

The internal-surface-scanning image recording apparatus is in widespread usage because the photosensitive medium is fixedly mounted on the semicylindrical inner circumferential surface of the support, and the image is recorded by rotating an exposure head for emitting the laser beam about the central axis of the semicylindrical inner circumferential surface, so that the photosensitive medium is prevented from being peeled off during the recording process, the recorded image has high dimensional accuracy, and the apparatus is capable of high-speed scanning and is highly economical.

FIGS. 1 and 2 of the accompanying drawings schematically show a conventional internal-surface-scanning image recording apparatus 2. As shown in FIGS. 1 and 2, the conventional internal-surface-scanning image recording apparatus 2 has a support 6 with a photosensitive medium S mounted on a semicylindrical inner circumferential surface 4 thereof, and a recording unit 8 for applying a laser beam L modulated with image information to the photosensitive medium S to record an image thereon.

The recording unit 8 has an arm 12 whose opposite ends movably engage in respective guide grooves 10a, 10b defined in the support 6 for movement in the auxiliary scanning direction indicated by the arrow Y. The recording unit 8 has an exposure head 14 housed therein for emitting a laser beam L. To the exposure head 14, there is connected a light source 16 for supplying the laser beam L that has been modulated with image information to the exposure head 14. The exposure head 14 and the light source 16 are movable about the central axis of the semicylindrical inner circumferential surface 4 for thereby scanning the photosensitive medium S with the laser beam L in the main scanning direction indicated by the arrow X.

In the conventional internal-surface-scanning image recording apparatus 2, because the image is recorded on the photosensitive medium S only when the exposure head 14 that outputs the laser beam L faces the photosensitive medium S, the laser beam L which is outputted by the exposure head 14 when the exposure head 14 does not face the photosensitive medium S is wasted. The conventional internal-surface-scanning image recording apparatus 2 cannot record the image at a high speed because the photosensitive medium S is scanned only in one cycle while the exposure head 14 makes one revolution if a single laser beam L is outputted from the exposure head 14.

The above drawbacks may be overcome by using a support 6 having a nearly fully cylindrical inner circumferential surface 4 to utilize the laser beam L effectively for increased recording efficiency. However, such a structure would make it difficult to attach the photosensitive medium S to and remove the photosensitive medium S from the support 6. Particularly, if an image is to be recorded on a printing plate, then the photosensitive medium S which is highly rigid needs to be curved to a large curvature, and may possibly be damaged when it is curved. Therefore, it is a time-consuming process to attach the photosensitive medium S to and remove the photosensitive medium S from the support, with the result that high-speed image recording cycles cannot be achieved.

High-speed image recording may be performed by increasing the speed at which the exposure head 14 rotates. When the exposure head 14 rotates at a high speed, it tends to suffer rotational speed irregularities, and it is liable to produce noise and heat.

SUMMARY OF THE INVENTION

It is a general object of the present invention to provide an internal-surface-scanning image recording apparatus which is capable of recording an image at a high speed with a high level of accuracy on a photosensitive medium.

A major object of the present invention is to provide an internal-surface-scanning image recording apparatus which is capable of increasing the efficiency with which to utilize a light beam to record an image on a photosensitive medium.

Still another object of the present invention is to provide an internal-surface-scanning image recording apparatus which can share a light source for recording an image at a high speed with an inexpensive arrangement.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
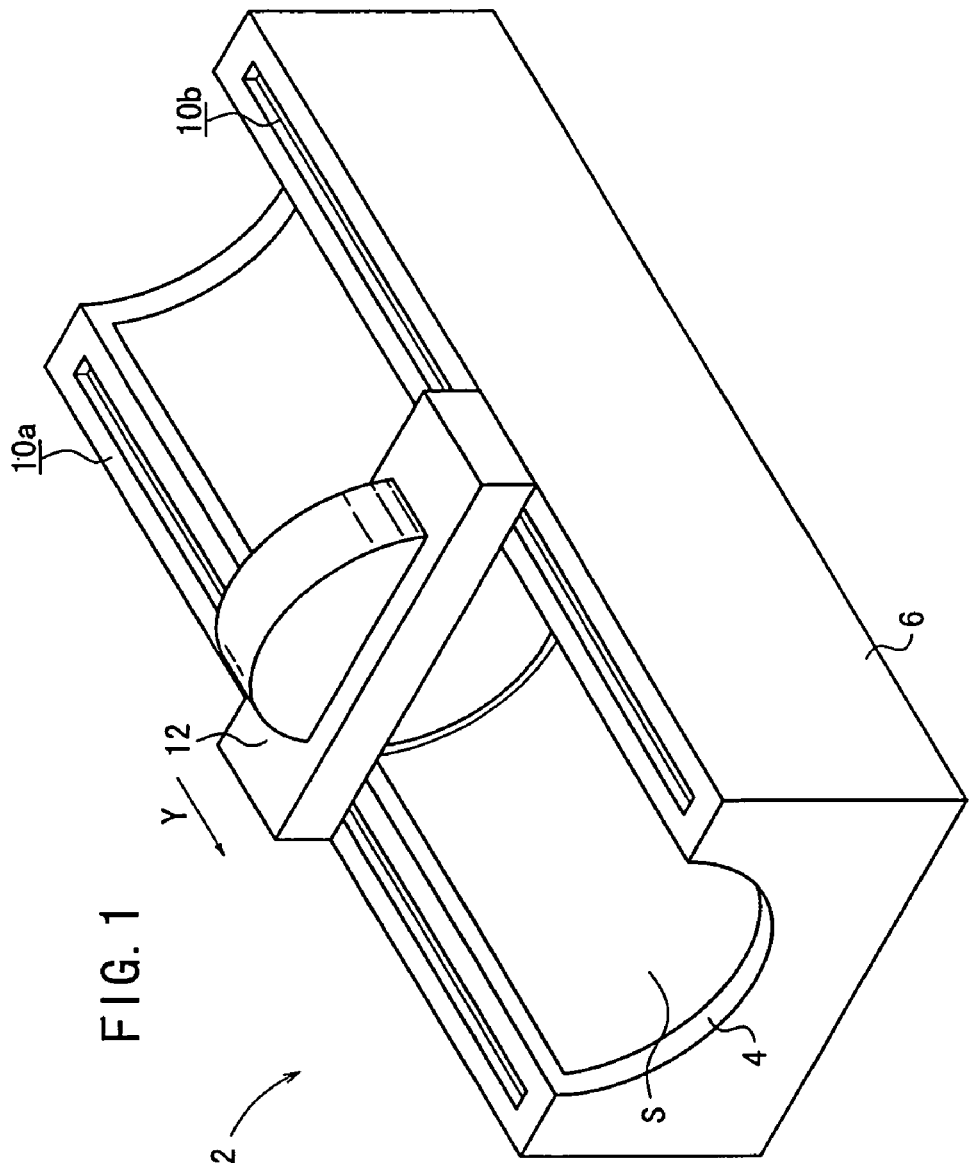
FIG. 1 is a fragmentary perspective view of a conventional internal-surface-scanning image recording apparatus.
Figure 2:
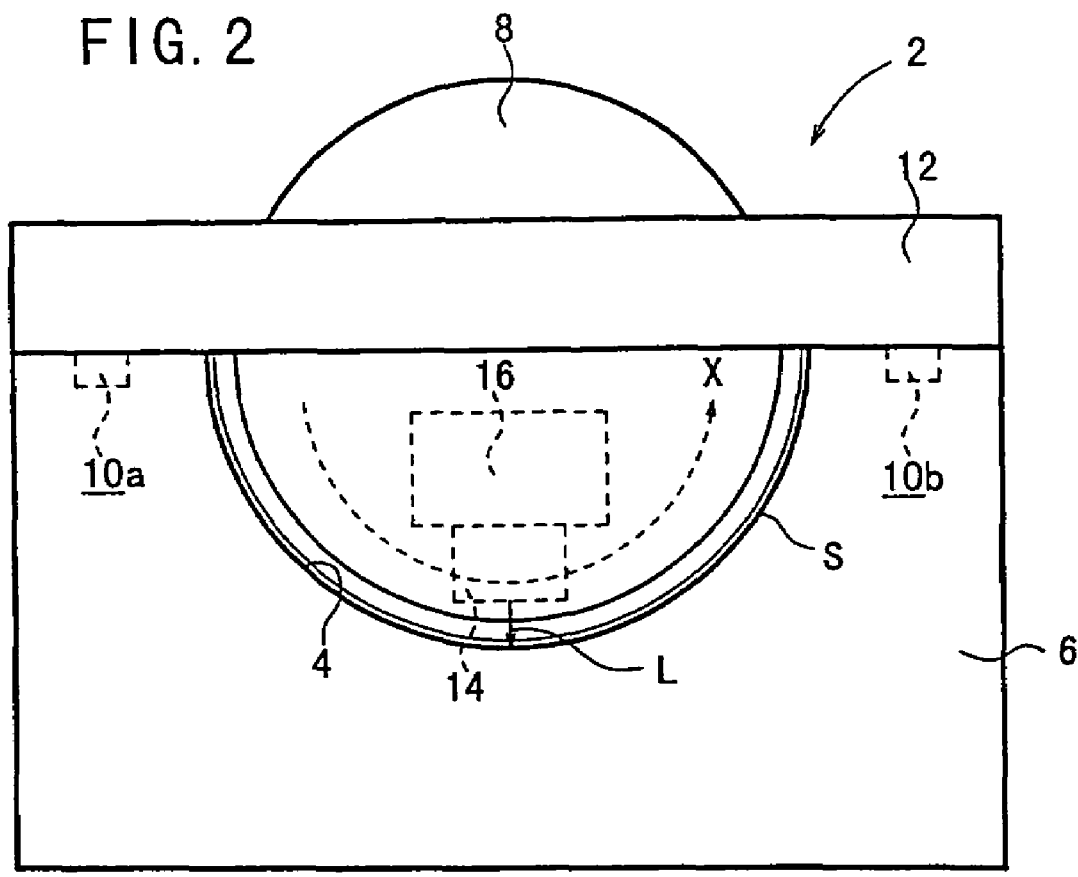
FIG. 2 is a front elevational view of the conventional internal-surface-scanning image recording apparatus shown in FIG. 1.
Figure 3:
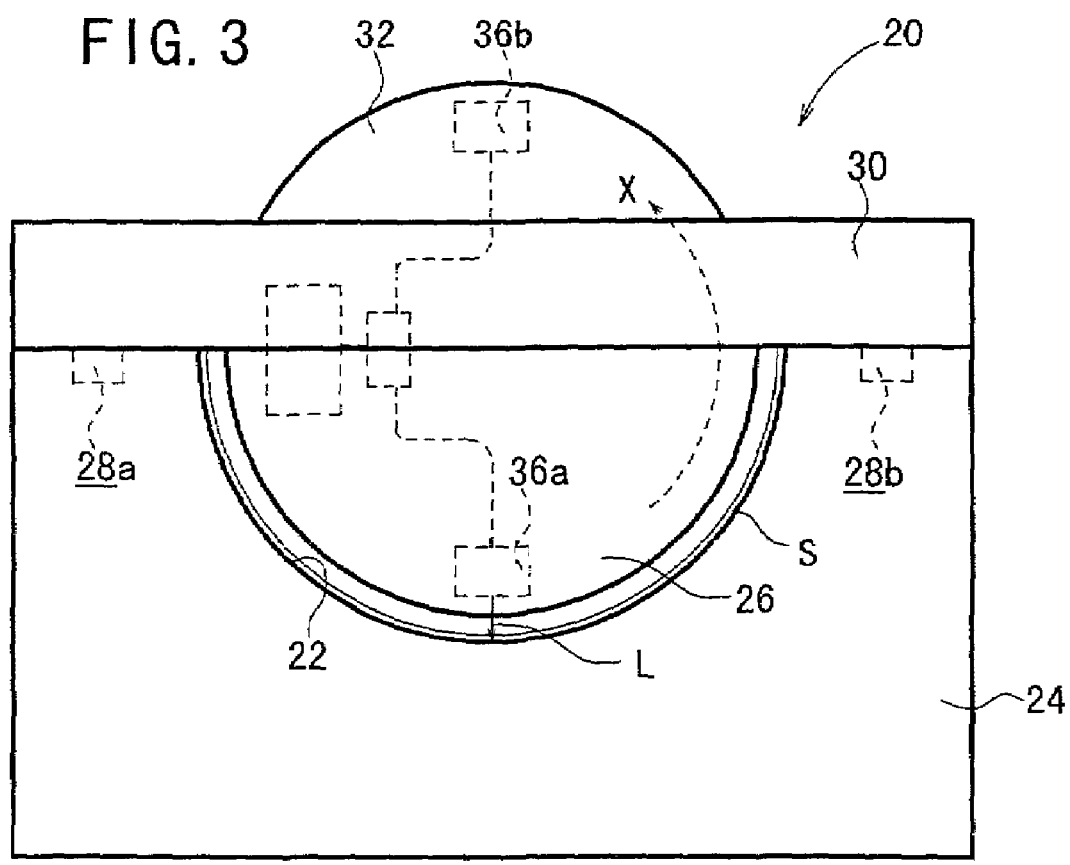
FIG. 3 is a front elevational view of an internal-surface-scanning image recording apparatus according to an embodiment of the present invention.

FIG. 3 shows an internal-surface-scanning image recording apparatus 20 according to an embodiment of the present invention. It is assumed that the internal-surface-scanning image recording apparatus 20 has the same appearance as the internal-surface-scanning image recording apparatus 2 shown in FIG. 1.

As shown in FIG. 3, the internal-surface-scanning image recording apparatus 20 generally comprises a support 24 with a photosensitive medium S mounted on a semicylindrical inner circumferential surface 22 thereof, and a recording unit 26 for applying a laser beam L modulated with image information to the photosensitive medium S to record an image thereon. The recording unit 26 has an arm 30 whose opposite ends movably engage in respective guide grooves 28a, 28b defined in the support 24 for movement in the auxiliary scanning direction which is perpendicular to the sheet of FIG. 3. The semicylindrical inner circumferential surface 22 subtends an angle of about 180° at the central axis thereof, i.e., the center of curvature thereof.

Figure 4:
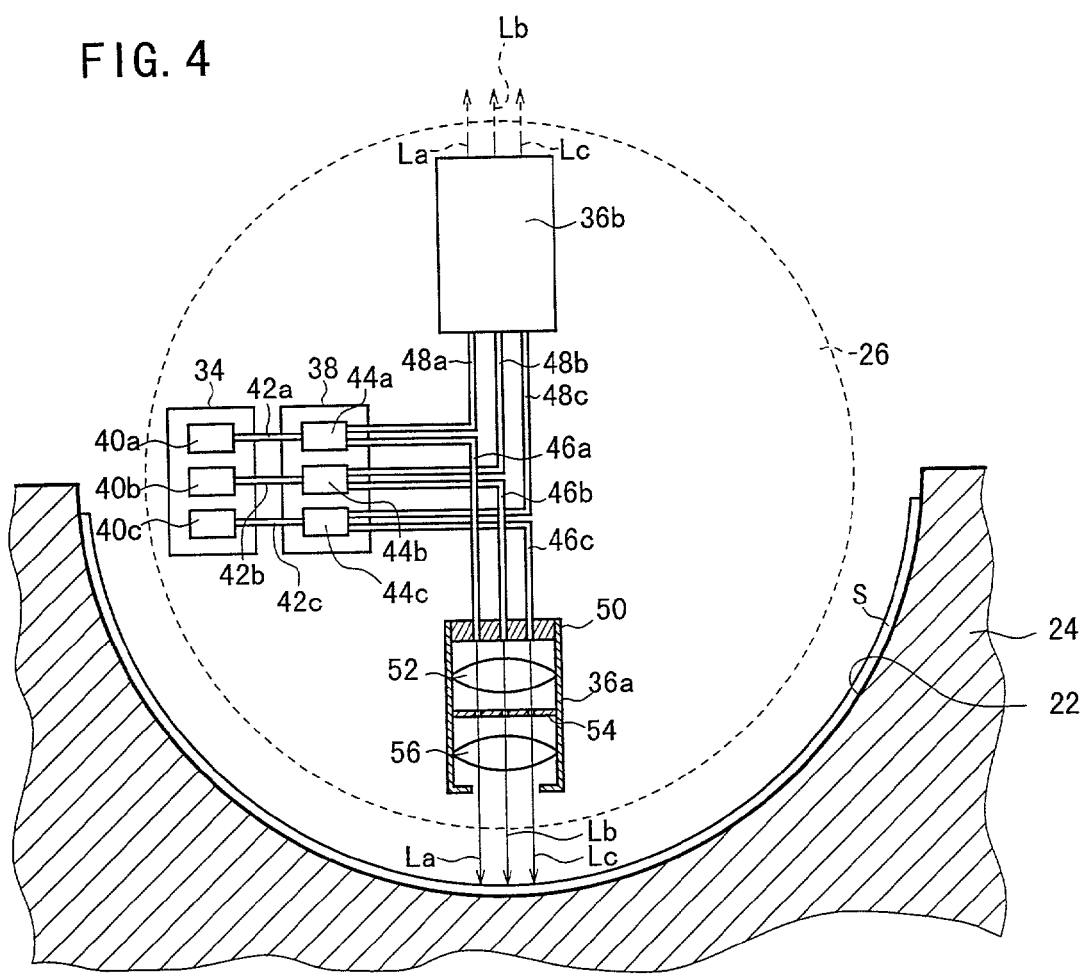
FIG. 4 is a fragmentary cross-sectional view of a recording unit of the internal-surface-scanning image recording apparatus shown in FIG. 3.

The recording unit 26 has a substantially cylindrical casing 32. As shown in FIG. 4, the cylindrical casing 32 houses therein a light source 34 for outputting a laser beam L that has been modulated with image information, two exposure heads 36a, 36b, and a switcher 38 for selectively supplying the laser beam L emitted from the light source 34 to the exposure heads 36a, 36b. The light source 34, the exposure heads 36a, 36b, and the switcher 38 are rotatable about the central axis of the semicylindrical inner circumferential surface 22 in the main scanning direction indicated by the arrow X. The casing 32 has slits, not shown, defined in regions thereof which face the photosensitive medium S for guiding the laser beam L to the photosensitive medium S.

The light source 34 has three laser diodes 40a, 40b, 40c for emitting respective laser beams La, Lb, Lc (collectively referred to as "laser beam L"). The laser beams La, Lb, Lc emitted from the respective laser diodes 40a, 40b, 40c are supplied to respective light switches 44a, 44b, 44c of the switcher 38 through optical fibers 42a, 42b, 42c. The light switches 44a, 44b, 44c have output ends connected respectively to sets of two optical fibers 46a, 48a, 46b, 48b, 46c, 48c. Of these optical fibers 46a, 48a, 46b, 48b, 46c, 48c, the optical fibers 46a, 46b, 46c are connected to the exposure head 36a, and the optical fibers 48a, 48b, 48c are connected to the exposure head 36b.

Each of the exposure heads 36a, 36b has a lens mount 50 to which the optical fibers 46a, 46b, 46c or the optical fibers 48a, 48b, 48c are connected. The lens mount 50 holds a condensing lens 52 for converging the laser beams La, Lb, Lc outputted from the optical fibers 46a, 46b, 46c or the optical fibers 48a, 48b, 48c, a spatial filter 54 for processing the laser beams La, Lb, Lc, and a condensing lens 56 for converging the laser beams La, Lb, Lc onto the photosensitive medium S. The exposure heads 36a, 36b are angularly spaced from each other by 180° in the circumferential direction of the casing 32, so that the laser beams La, Lb, Lc outputted from the exposure head 36a and the laser beams La, Lb, Lc outputted from the exposure head 36b are directed 180° apart from each other.

Figure 5:
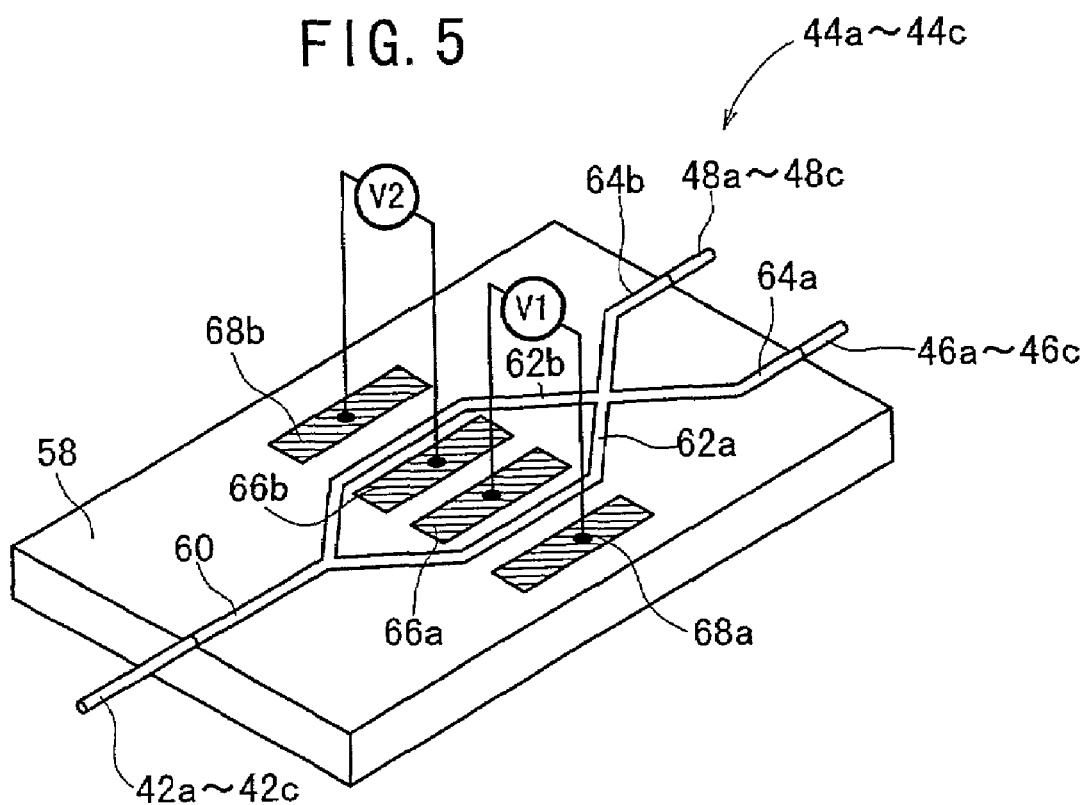
FIG. 5 is a perspective view of a switcher in the recording unit shown in FIG. 4.

FIG. 5 shows a specific arrangement of each of the light switches 44a, 44b, 44c. As shown in FIG. 5, each of the light switches 44a, 44b, 44c comprises an input waveguide 60 mounted on a substrate 58, a pair of branched waveguides 62a, 62b mounted on the substrate 58 and branched from the input waveguide 60, and a pair of output waveguides 64a, 64b mounted on the substrate 58 and branched from a junction where the branched waveguides 62a, 62b join each other. The input waveguides 60 of the light switches 44a, 44b, 44c are connected to respective optical fibers 42a, 42b, 42c that are connected to the respective laser diodes 40a, 40b, 40c. The output waveguides 64a, 64b of the light switches 44a, 44b, 44c are connected to the optical fibers 46a, 46b, 46c and the optical fibers 48a, 48b, 48c. Each of the light switches 44a, 44b, 44c also has electrodes 66a, 68a disposed on the substrate 58 one on each side of the branched waveguide 62a, and electrodes 66b, 68b disposed on the substrate 58 one on each side of the branched waveguide 62b. Control voltages V1, V2 for changing paths of the laser beam La, Lb, Lc are applied between the electrodes 66a, 68a and between the electrodes 66b, 68b.

Figure 6:
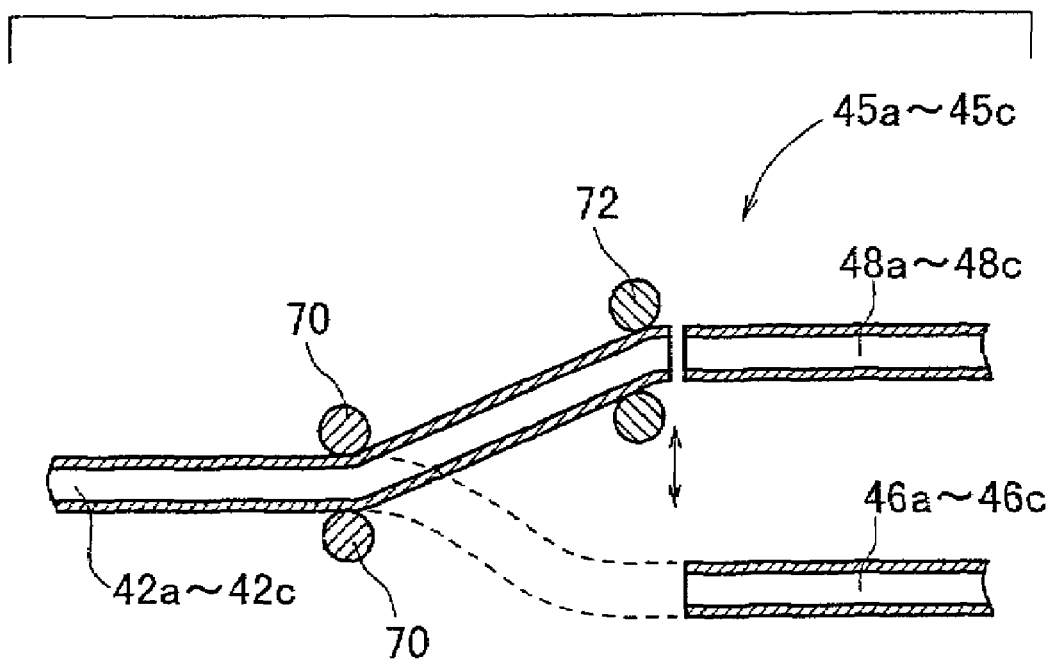
FIG. 6 is a cross-sectional view of optical switches of a switcher according to another embodiment of the present invention.

FIG. 6 shows optical switches of a switcher according to another embodiment of the present invention. In FIG. 6, each of optical switches 45a, 45b, 45c has a mount 70 which holds an output end portion of each of the optical fibers 42a, 42b, 42c and a movable member 72 which holds an output end of each of the optical fibers 42a, 42b, 42c. The movable member 72 is displaceable between a position aligned with one of the optical fibers 46a, 46b, 46c and a position aligned with one of the optical fibers 48a, 48b, 48c, by a displacement mechanism such as a cylinder based on a switching signal, for thereby guiding the laser beams La, Lb, Lc to a desired one of the exposure heads 36a, 36b.

Figure 7:
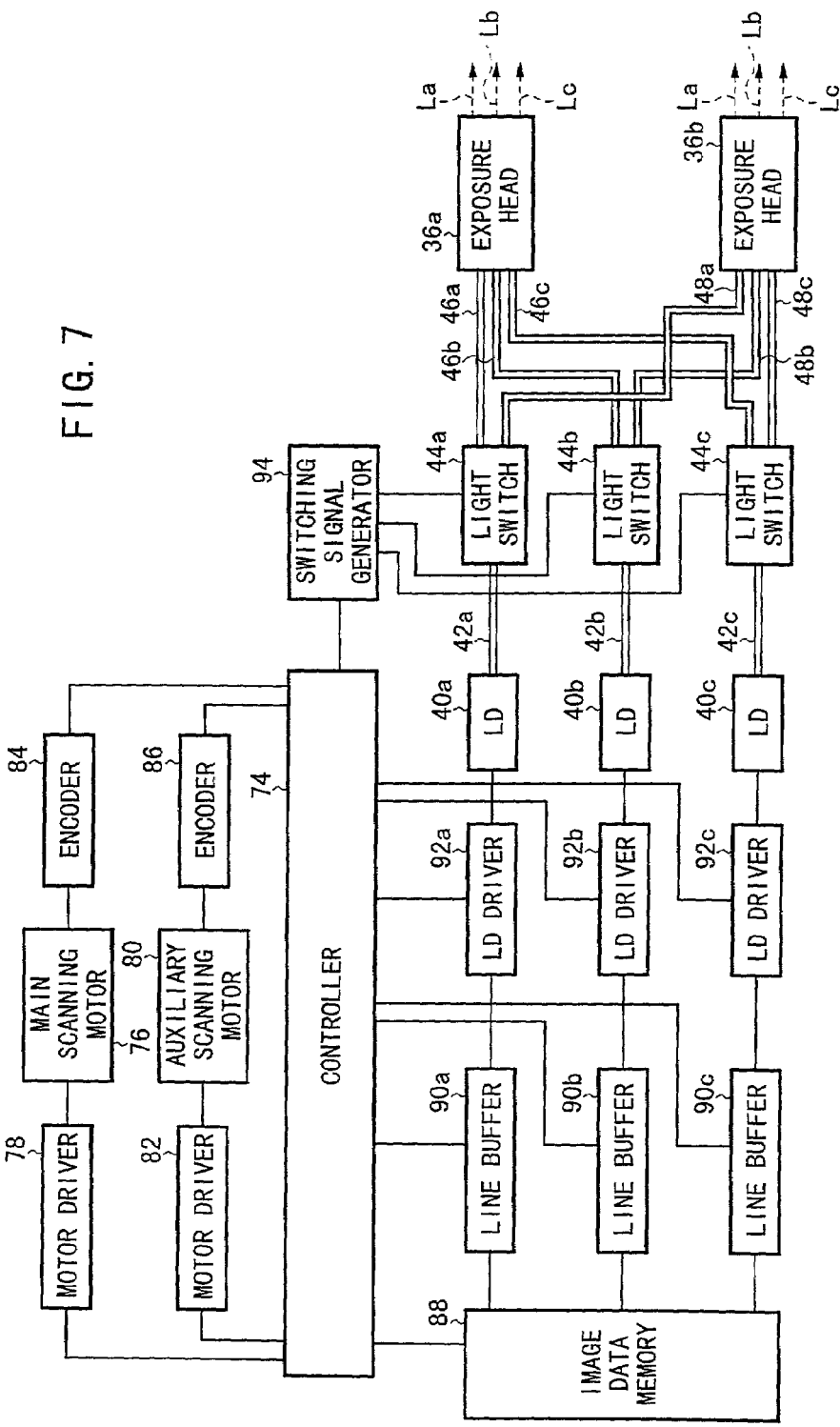
FIG. 7 is a block diagram of a control circuit of the internal-surface-scanning image recording apparatus shown in FIG. 3.

FIG. 7 shows in block form a control circuit of the internal-surface-scanning image recording apparatus 20 shown in FIG. 3.

As shown in FIG. 7, the control circuit of the internal-surface-scanning image recording apparatus 20 has a controller 74 for controlling overall operation of the internal-surface-scanning image recording apparatus 20. To the controller 74, there are connected a motor driver 78 for energizing a main scanning motor 76 to rotate the light source 34, the switcher 38, and the exposure heads 36a, 36b of the recording unit 26 in the main scanning direction indicated by the arrow X, and a motor driver 82 for energizing an auxiliary scanning motor 80 to move the recording unit 26 in the auxiliary scanning direction (indicated by the arrow Y in FIG. 1). Encoders 84, 86 are connected respectively to the main scanning motor 76 and the auxiliary scanning motor 80 for detecting angular displacements thereof. Detected angular displacement signals from the encoders 84, 86 are supplied to the controller 74.

To the controller 74, there are also connected an image data memory 88 for storing image data representing image information to be recorded on the photosensitive medium S, a plurality of line buffers 90a, 90b, 90c for temporarily storing image data for the laser diodes 40a, 40b, 40c for each main scanning line supplied from the image data memory 88, a plurality of laser diode (LD) drivers 92a, 92b, 92c for energizing the laser diodes 40a, 40b, 40c, respectively, based on the image data supplied from the respective line buffers 90a, 90b, 90c, and a switching signal generator 94 for generating switching signals to perform laser beam path switching in the light switches 44a, 44b, 44c.

Operation of the internal-surface-scanning image recording apparatus 20 thus constructed will be described below.

Prior to recording an image, the photosensitive medium S is mounted on the semicylindrical inner circumferential surface 22 of the support 24. Since the semicylindrical inner circumferential surface 22 subtends the angle of about 180° at the central axis thereof, the photosensitive medium S can easily be mounted on and removed from the semicylindrical inner circumferential surface 22 of the support 24.

The controller 74 supplies control signals to the motor drivers 78, 82, and also supplies the image data memory 88 to output image data for the laser diodes 40a, 40b, 40c to the line buffers 90a, 90b, 90c.

Based on the supplied control signal, the motor driver 78 energizes the main scanning motor 76 to rotate the light source 34, the switcher 38, and the exposure heads 36a, 36b of the recording unit 26 in the main scanning direction indicated by the arrow X. Based on the supplied control signal, the motor driver 82 energizes the auxiliary scanning motor 80 to move the recording unit 26 in the auxiliary scanning direction as it is guided along the guide grooves 28a, 28b by the arm 30.

The image data for each main scanning line temporarily stored in the line buffers 90a, 90b, 90c are supplied to the LD drivers 92a, 92b, 92c, which energize the respective laser diodes 40a, 40b, 40c. The laser diodes 40a, 40b, 40c output respective laser beams La, Lb, Lc depending on the image data, and the laser beams La, Lb, Lc are supplied via the optical fibers 42a, 42b, 42c to the light switches 44a, 44b, 44c.

The light switches 44a, 44b, 44c are supplied with switching signals depending on the scanning positions of the exposure heads 36a, 36b from the switching signal generator 94. The laser beams La, Lb, Lc are supplied to either one of the exposure heads 36a, 36b which is selected by the light switches 44a, 44b, 44c based on the switching signals supplied thereto.

Specifically, the angular positions of the exposure heads 36a, 36b are detected by the encoder 84 that is connected to the main scanning motor 76. Based on the detected angular positions of the exposure heads 36a, 36b, the controller 74 applies the control voltages V1, V2 between the electrodes 66a, 68a and between the electrodes 66b, 68b in order to guide the laser beams La, Lb, Lc to one of the exposure heads 36a, 36b which is in a position facing the photosensitive medium S. The applied control voltages V1, V2 control the refractive index of the branched waveguides 62a, 62b to adjust the phase differences between the laser beams La, Lb, Lc led to the branched waveguides 62a, 62b for thereby guiding the laser beams La, Lb, Lc to desired ones of the output waveguides 64a, 64b.

For example, when the exposure head 36a faces the photosensitive medium S, the controller 74 controls the control voltages V1, V2 applied between the electrodes 66a, 68a and between the electrodes 66b, 68b in order to prevent the laser beams La, Lb, Lc from passing through the output waveguide 64b and allow the laser beams La, Lb, Lc to pass through the output waveguide 64a. As a result, the laser beams La, Lb, Lc which have been outputted from the laser diodes 40a, 40b, 40c and applied via the optical fibers 42a, 42b, 42c to the input waveguides 60 of the light switches 44a, 44b, 44c are supplied from the branched waveguides 62b via the output waveguides 64a to the optical fibers 46a, 46b, 46c, from which the laser beams La, Lb, Lc are guided to the exposure head 36a only.

The laser beams La, Lb, Lc guided to the exposure head 36a are converged by the condensing lens 52, pass through the spatial filter 54, and then converged by the condensing lens 56 onto the photosensitive medium S, thus recording an image made up of three main scanning lines thereon.

When the exposure head 36a turns 180° out of the recording range of the photosensitive medium S, the switching signal generator 94 outputs switching signals to the light switches 44a, 44b, 44c based on the angular positions detected by the encoder 84, switching the laser beams La, Lb, Lc to the exposure head 36b. The exposure head 36b as it enters the recording range of the photosensitive medium S applies the laser beams La, Lb, Lc to the photosensitive medium S, continuing the image recording process.

As described above, the image recording cycles of the exposure heads 36a, 36b in the main scanning direction are alternately performed, i.e., the exposure heads 36a, 36b are selected one at a time, each time the recording unit 26 is rotated 180°. At the same time, the recording medium 26 is moved by the auxiliary scanning motor 80 in the auxiliary scanning direction indicated by the arrow Y. As a result, the image is two-dimensionally recorded on the photosensitive medium S at a high speed by effectively utilizing the laser beams La, Lb, Lc.

The light switches 45a, 45b, 45c shown in FIG. 6 may be used to mechanically change the paths of the laser beams La, Lb, Lc to record an image continuously on the photosensitive medium S at a high speed.

In the above embodiments, the two exposure heads 36a, 36b are angularly displaced 180° from each other, and selected one at a time to perform the image recording cycle each time the recording unit 26 is rotated 180°. However, three exposure heads may be angularly displaced 120° from each other, and selected one at a time to perform the image recording cycle each time the recording unit is rotated 120°. In this modification, the semicylindrical inner circumferential surface 22 subtends an angle of about 120° at the central axis thereof. Therefore, even if an image is to be recorded on a printing plate, the photosensitive medium S which is highly rigid can be curved and mounted on and removed from the support 24 relatively easily.

Although certain preferred embodiments of the present invention have been shown and described in detail, it should be understood that various changes and modifications may be made therein without departing from the scope of the appended claims.

What is claimed is:

1. An internal-surface-scanning image recording apparatus for applying a light beam modulated with image information to a photosensitive medium mounted on a partly cylindrical inner circumferential surface of a support to record an image on the photosensitive medium, comprising:
   a light source for outputting the light beam modulated with the image information;
   a plurality of exposure heads disposed on a circular surface at an angularly spaced interval, for guiding the light beam outputted from said light source to the photosensitive medium; and
   a switcher disposed between said light source and said exposure heads, for guiding the light beam outputted from said light source to a selected one of said exposure heads which faces the photosensitive medium;
   whereby said light beam can be guided selectively to the exposure heads to record an image on said photosensitive medium.

2. An internal-surface-scanning image recording apparatus according to claim 1, wherein said light source, said switcher, and said exposure heads are connected by optical fibers.

3. An internal-surface-scanning image apparatus according to claim 1, wherein said light source comprises a plurality of laser diodes for outputting respective laser beams to be modulated with the image information, each of said exposure heads having means for applying said laser beams outputted from said laser diodes simultaneously to said photosensitive medium.

4. An internal-surface-scanning image recording apparatus according to claim 1, wherein said angularly spaced interval at which said exposure heads are disposed on the circular surface corresponds to an angle subtended by said partly cylindrical inner circumferential surface at a central axis thereof.

5. An internal-surface-scanning image recording apparatus according to claim 1, wherein said switcher comprises optical waveguides for electrically controlling a path of said light beam.

6. An internal-surface-scanning image recording apparatus according to claim 1, further comprising an optical fiber connected to said light source, wherein said switcher comprises a movable member for selectively connecting said optical fiber to said exposure heads.

7. An internal-surface-scanning image recording apparatus according to claim 6, wherein said movable member aligns said optical fiber connected to said light source with an optical fiber connected to a respective one of said exposure heads.

8. An internal-surface-scanning image recording apparatus according to claim 5, wherein said switcher guides said light beam to a desired output waveguide by application of control voltages to said switcher.

9. An internal-surface-scanning image recording apparatus according to claim 1, wherein said circular surface has an axis of rotation coinciding with a central axis of said partly cylindrical inner circumferential surface.

10. An internal-surface-scanning image recording apparatus according to claim 1, wherein said light beam is guided to a selected one of said exposure heads which enters a recording range of the photosensitive medium.

11. An internal-surface-scanning image recording apparatus according to claim 1, wherein said light source, said plurality of exposure heads and said switcher are rotatable about a central axis of the partly cylindrical inner circumferential surface in a main scanning direction.

12. An internal-surface-scanning image recording apparatus according to claim 1, further comprising an encoder which detects angular positions of said plurality of exposure heads, wherein said switcher is controlled by a detection result of said encoder.

13. An internal-surface-scanning image recording apparatus according to claim 1, wherein when one of said plurality of exposure heads first enters a recording range of said photosensitive medium, said switcher guides said light beam to said one of said plurality of exposure heads to record an image on said photosensitive medium, said switcher guiding said light beam to another one of said plurality of exposure heads to continue recording said image when said another one of said plurality of exposure heads enters the recording range of said photosensitive medium.

14. An internal-surface-scanning image recording apparatus according to claim 11, wherein when one of said plurality of exposure heads first enters a recording range of said photosensitive medium, said switcher guides said light beam to said one of said plurality of exposure heads to record an image on said photosensitive medium, said switcher guiding said light beam to another one of said plurality of exposure heads to continue recording said image when said another one of said plurality of exposure heads enters the recording range of said photosensitive medium.

15. An internal-surface-scanning image recording apparatus according to claim 1, wherein said plurality of exposure heads are disposed on a portion of the same circular surface.

* * * * *